United States Patent
Yuca et al.

(10) Patent No.: US 10,312,505 B2
(45) Date of Patent: Jun. 4, 2019

(54) USAGE OF CONDUCTIVE AND FLEXIBLE POLYMERS IN LITHIUM BATTERIES

(71) Applicant: ENWAIR ENERJI TEKNOLOJILERI A. S., Istanbul (TR)

(72) Inventors: Neslihan Yuca, Istanbul (TR); Murat Ferhat Dogdu, Istanbul (TR); Omer Suat Taskin, Istanbul (TR); Mehmet Emre Cetintasoglu, Istanbul (TR)

(73) Assignee: ENWAIR ENERJI TEKNOLOJILERI A.S., Istanbul (TR)

( * ) Notice: Subject to any disclaimer, the term of this patent is extended or adjusted under 35 U.S.C. 154(b) by 64 days.

(21) Appl. No.: 15/551,040

(22) PCT Filed: Dec. 21, 2016

(86) PCT No.: PCT/TR2016/050518
§ 371 (c)(1),
(2) Date: Aug. 15, 2017

(87) PCT Pub. No.: WO2017/119861
PCT Pub. Date: Jul. 13, 2017

(65) Prior Publication Data
US 2018/0034040 A1 Feb. 1, 2018

(30) Foreign Application Priority Data
Jan. 7, 2016 (TR) .............. a 2016 00220

(51) Int. Cl.
*H01M 4/134* (2010.01)
*H01M 4/38* (2006.01)
(Continued)

(52) U.S. Cl.
CPC .......... *H01M 4/134* (2013.01); *C08G 61/124* (2013.01); *C08G 61/126* (2013.01); *C08L 65/00* (2013.01);
(Continued)

(58) Field of Classification Search
CPC ..................................................... H01M 4/134
(Continued)

(56) References Cited

U.S. PATENT DOCUMENTS

| 6,300,015 B1 | 10/2001 | Nishiyama et al. |
| 7,311,997 B2 | 12/2007 | Thakur |
| 8,852,461 B2 | 10/2014 | Liu et al. |

FOREIGN PATENT DOCUMENTS

WO WO2014026112 A1 2/2014

OTHER PUBLICATIONS

Yamaguchi et al; Enzyme and transition-metal-complex catalyzed— thermal properties; Macromolecules (Washington DC0, 2009, 42(20), 7836-7845 (1of 1 CAPLUS in 15551040 STN-CPC) (Year: 2009).*
(Continued)

*Primary Examiner* — Duc Truong
(74) *Attorney, Agent, or Firm* — Gokalp Bayramoglu

(57) ABSTRACT

The present invention relates to a production method of a block copolymer (PFPEG) formed by PEG fluorenes and thiophene blocks. The block copolymer (PFPEG) increases the conductivity of the electrolyte active material. The binding of both the active material to itself and to the base material increase the flexibility of the copolymer when used in the electrodes of lithium batteries. The present invention also relates to a usage of the block copolymer (PFPEG) in lithium batteries.

6 Claims, 2 Drawing Sheets

(51) Int. Cl.
    *C08G 61/12* (2006.01)
    *C08L 65/00* (2006.01)
    *H01M 4/62* (2006.01)
    *H01M 10/0525* (2010.01)
    *H01M 10/052* (2010.01)

(52) U.S. Cl.
    CPC ............ *H01M 4/38* (2013.01); *H01M 4/622* (2013.01); *H01M 10/0525* (2013.01); *C08G 2261/14* (2013.01); *C08G 2261/1412* (2013.01); *C08G 2261/1424* (2013.01); *C08G 2261/1426* (2013.01); *C08G 2261/312* (2013.01); *C08G 2261/3221* (2013.01); *C08G 2261/3223* (2013.01); *C08G 2261/411* (2013.01); *C08G 2261/51* (2013.01); *H01M 10/052* (2013.01)

(58) Field of Classification Search
    USPC ........................................................ 528/361
    See application file for complete search history.

(56) References Cited

OTHER PUBLICATIONS

Mingyan Wu et al: "Toward an Ideal Polymer Binder Design for High-Capacity Battery Anodes", Journal of the American Chemical Society, vol. 136, No. 32, Aug. 14, 2013 pp. 12048-12056, XP055356194, ISSN: 0002-7863, DOI:10.1021/ja4054465 the whole document.

* cited by examiner

USAGE OF CONDUCTIVE AND FLEXIBLE POLYMERS IN LITHIUM BATTERIES

CROSS REFERENCE TO RELATED APPLICATIONS

This application is the national phase entry of International Application No. PCT/TR2016/050518, filed on Dec. 21, 2016, which is based upon and claims priority to Turkey Patent Application No. TR2016/00220, filed on Jan. 7, 2016, the entire contents of which are incorporated herein by reference.

TECHNICAL FIELD

The invention relates to a production method of a block copolymer (PFPEG) formed by PEG fluorene and thiophene blocks which increases the conductivity of the electrolyte active material. The binding, or in other words the binding of both the active material to itself and to the base material increase the flexibility of the copolymer when used in the electrodes of lithium batteries. The present invention also relates to a usage of the block copolymer in lithium batteries.

BACKGROUND

Lithium ion batteries, a member of the rechargeable secondary battery group, are able to provide high energy in comparison to their volume and weight. Lithium, a metal having a light and high oxidation potential, contributes to these batteries, thereby ensuring the batteries with a high gravimetric and volumetric energy density. Lithium ions are switched between the anode (negative electrode) and the cathode (positive electrode) and they move from anode to cathode during discharging and from cathode to anode during charging.

Lithium ion batteries have been initially widely preferred as a power source for consumer electronics (mobile phones, laptop computers, digital cameras, cameras, etc.) and other wireless, portable electronic devices. Moreover, lithium ion batteries are used in military applications and in the aviation field for operating of aircraft emergency systems. On the other hand, recent developments in lithium-ion battery technology have made it possible to use these batteries in electric vehicles in fixed energy storage systems and smart networks for the storage of renewable energy types such as solar energy and wind energy.

The polymer binders used in rechargeable batteries enable the active materials used in the electrodes to be connected to each other and allows the active material to be connected to the accumulator used. These binders are generally composed of one or more polymers. Commonly used binders in commercial lithium ion batteries are polyvinyldifluoride (PVDF) and ethylene-propylene diene. These polymers are soluble in organic solvents such as N-methyl pyrrolidone (NMP) because they are mostly water-insoluble. These organic solvents also allow the electrode active materials and other admixture materials if available, to be dispersed homogeneously in the solvent together. However, the organic solvents used are expensive and they can be harmful to the environment. Besides, as PVDF is not stable at high temperatures, its structure deteriorates.

Examples of water-soluble binders include carboxymethyl cellulose (CMC). In addition to CMC, polytetrafluoroethylene (PTFE) and styrene butadiene rubber are also water-soluble binders. However these binders reduce the cycle life of the electrodes when used because they provide low adhesion. During mass production, it is desirable to dissolve the binders in water, which is much cheaper than using organic solvent, and it is very important for the water-soluble binders to provide the desired performance to the electrode structure.

Nowadays the commercially available negative electrode is graphite as it presents structural stability during charging and discharging and low volumetric expansion during the reaction with lithium. Graphite forms the $LiC_6$ compound with 1 lithium atom with 6 C atoms retained. This situation causes the theoretical capacity of the graphite material to be low (372 mAh/g). One of the approaches that have been tried in order to increase the capacity is to change the active materials used in electrodes. Due to their high theoretical capacities aluminium (Al), silicium (Si), tin (Sn), and antimone (Sb) are metals tried most as electrode active materials nowadays. However, it appears that the incorporation of lithium into the structure of these metals during conversion has led to a change in the lattice structures and a volume increase of more than 200% per unit cell. This situation leads to deterioration of the crystal structure and decrease of the capacity due to the increase of the lithium ratio in the lithium-active metal compound with progressive conversions. At the same time, this high amounts of volumetric change created leads to the increase of the internal tension of the electrode structure, resulting in fracture formation in the electrode structure.

Polymers used as binding agents in electrodes can maintain the structure, and suppress the internal tensions and volumetric expansions caused by the reaction of commercially available graphite with lithium. However, in metals that show more than 200% volumetric change following reaction with lithium that have been tried instead of graphite, the binding polymers (CMC, PVDF, EPDM) used for graphite do not have the binding capacity or flexibility that can tolerate volumetric changes presented due to the fact that metals arrest more lithium (Al, Si, Sn, Sb). For this reason, the use of polymers in such metals that exhibit these types of high volumetric changes as active materials in the electrodes of lithium ion batteries, is of great importance.

Another problem of the electrode active materials used in lithium ion batteries is that they are not sufficiently conductive and depending on this fact their electrode structure deteriorates in high charge and discharge rates. For this reason, additives that increase the conductivity are added to electrode active materials. These additives can be carbon-based materials (such as carbon black, graphene, super-P conductor) as well as conductive polymers (PT, PANI). However, in order to increase conductivity in addition to the polymers used as binders, the addition of carbon-based materials increases both cost and battery weight. Therefore, nowadays it important to provide conductivity to polymers used as binders.

It is important therefore for the polymer or polymers that are used, to be conductive and moreover water soluble in terms of production costs.

In order for the binding polymers to maintain the structure in spite of the defined volume changes, their fluorescence characteristics have to be developed. In order for a high conductive characteristics, groups such as pyrrole and thiophene need to be present inside the polymer.

Patent documents such as U.S. Pat. No. 8,852,461 B2, WO2014026112 A1, U.S. Pat. Nos. 7,311,997 B2 and 6,300,015 can be given as examples to the known state of the art. However, these documents are different to the invention in many aspects. Moreover, the methods applied in the present technique are not satisfactory in terms of being cost-effective.

SUMMARY

In the present invention, the problems of solubility of conductive polymers used in the lithium-ion batteries and of not being able to protect the silicon structure have been imparted flexibility by bonding polyethylene glycol (PEG) groups to the structure. By this means efficient results have been obtained as the silicium structure did not deteriorate for a long period of time during lithiation and delithiation processes. As a difference to other studies, PEG groups have been bound to one of the monomers and it is additionally enabled for a new group to be bound to the block copolymer. The methods applied in the present technique are not satisfactory in terms of being cost-effective.

As a result, it is anticipated for the synthesized polymer to be applied to lithium ion batteries and for the batteries to operate with higher efficiency in comparison to other batteries.

BRIEF DESCRIPTION OF THE DRAWINGS

FIG. 1 shows a graphic in which charging and discharging have been carried out a 1000 times for an anode lithium ion battery that has been prepared with PEG addition polymer. As the electrode maintains its structural integrity for 1000 cycles the specific capacity has been maintained as an average of 700 mAh/g.

DETAILED DESCRIPTION

According to our invention, we have been producing electrodes using conductive and flexible polymers whose electrode active materials have been synthesized. The polymer we synthesized comprises conductive and flexible groups. Polymers used commercially in lithium batteries are however not conductive or flexible. By means of the conductivity we provided with our conductive polymer to our electrode, carbon based materials are not used as conductivity increasing agents in commercially used electrodes. Moreover, by means of the flexibility provided by our polymer the electrode structure preserves its integrity. The reason for this is that, according to the operating mechanism of the battery, while the Li$^+$ ions move between anode and cathode electrodes, they position themselves into said electrode structures and in such a case the electrode structure swells up. Under the condition that the structure is not sufficiently flexible, then it breaks into pieces and disintegrates due to swelling. The flexible polymers synthesized according to our invention compensate this volumetric swelling. Thus, the active material is able to protect the structure of the battery during swelling and shrinkage in case of charge discharge. This ensures the electrode can withstand long cycles. Furthermore, since the pulverization of the structure is prevented, the capacity of the electrode shall be used significantly. In this case, the life span of the battery and its capacity shall be increased.

Figure 1:
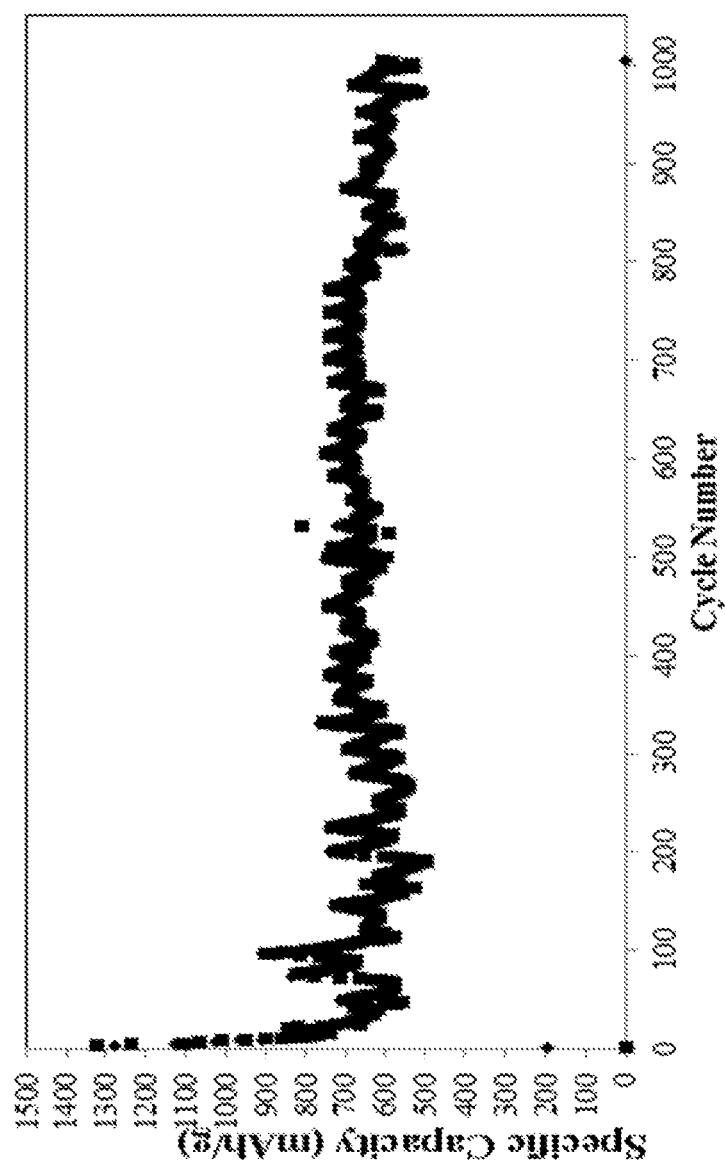
FIG. 1: Specific capacity-conversion graphic.
Figure 2:
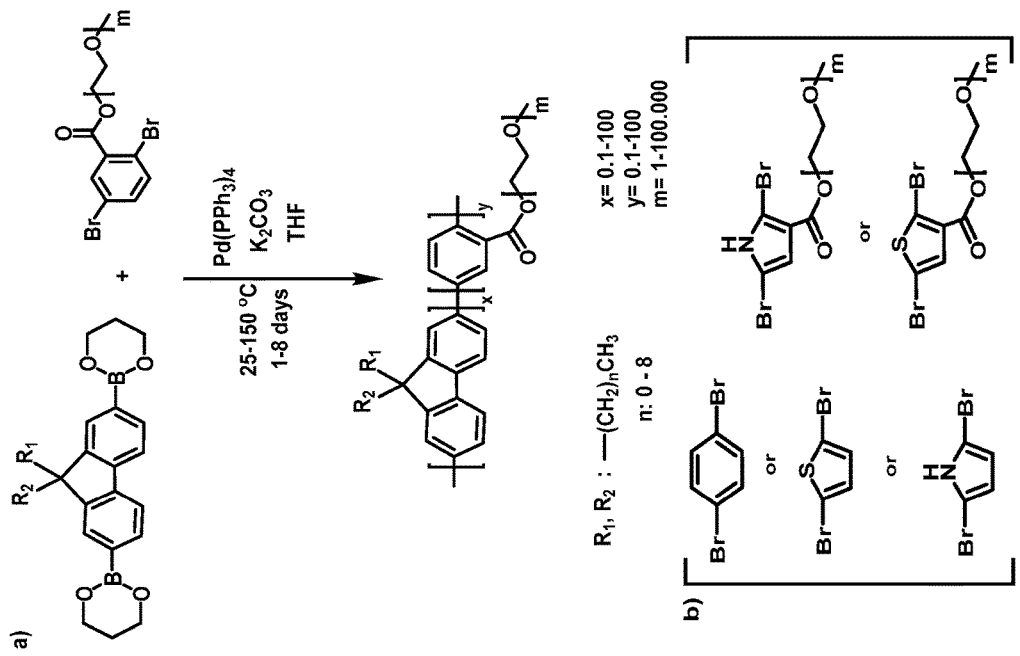
FIG. 2: Schematic representation of the polymer synthesis (a) different monomers that are applicable (b)

In order to solve the problem, a polymer having a conductive and flexible structure has been developed. In this respect, the production of polymers is carried out using the Suzuki Coupling method, in the presence of 9,9-Dihexyl-fluorene-2,7-diboronic acid bis (1,3-propanediol) ester and 2,5-dibromothiophene (or pyrrole or phenylene) with the catalyst palladium, by mixing at 25-150° C. for 1-8 days (FIG. 1). The polymeric material obtained shall be a block copolymer made of PEG, fluorene and thiophene blocks. The contents of fluorene and thiophene in this block copolymer, play a significant role in the efficient operation of the material and therefore their usage ratios (equivalents) within the reaction are respectively 1:2. The reason for excessive usage of thiophene concentration is that it plays an important role in increasing the conductivity of the structure. Fluorene has been preferred as it presents high conjugation features. The aim of adding PEG groups to the polymer structure is to ensure flexibility to the polymer structure that is to be obtained. The addition of PEG groups has been obtained by addition reaction with acid catalyst using 2,5-dibromothiophene-3-carboxylic acid. The molecular weights of PEG groups vary between 500 to 10000.

What is claimed is:
1. A block copolymer for lithium ion batteries, represented by Formula 1:
<Formula 1>

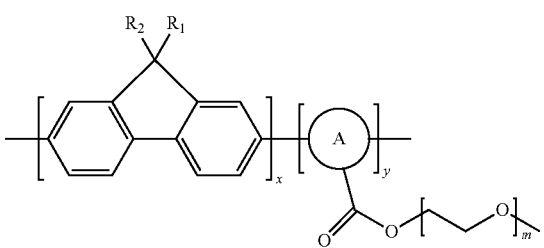

wherein
A is selected from the group consisting of phenylene

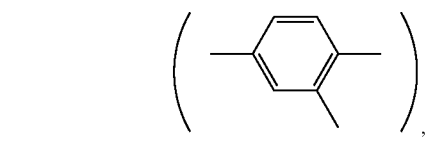

pyrrole

and thiophene

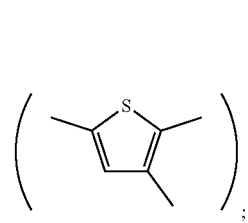

$R_1$ and $R_2$ are each independently —$(CH_2)_nCH_3$, and n is an integer selected from 0 to 8;

x is 1 to 100;
y is 1 to 100; and
m is 1 to 100,000.

2. The block copolymer of claim 1, wherein A is phenylene

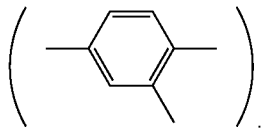

3. The block copolymer of claim 1, wherein A is thiophene

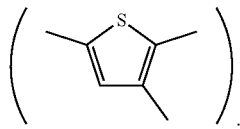

4. The block copolymer of claim 1, wherein the ratio of x:y is 1:2.

5. The block copolymer of claim 1, wherein the molecular weight of the polyethylene glycol (PEG) group is between 500 to 10,000.

6. A method for preparing the block copolymer of claim 1, comprising
activating a 9,9-dihexylfluorene-2,7-diboronic acid bis (1,3-propanediol) ester and a monomer selected from a group consisting of

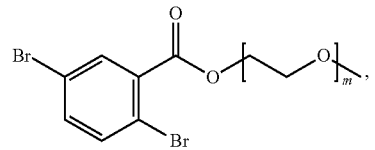

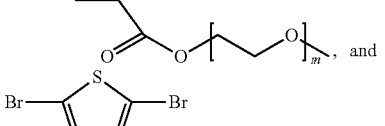, and

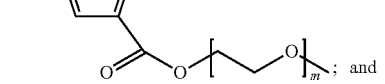; and mixing the reactivated ester and monomer, wherein m is 1 to 100,000.

* * * * *